Dec. 3, 1946.                    W. TRINKS                    2,412,069
            DRIVING MEANS FOR ROLLER ELECTRODES AND THE LIKE
                         Filed June 16, 1944
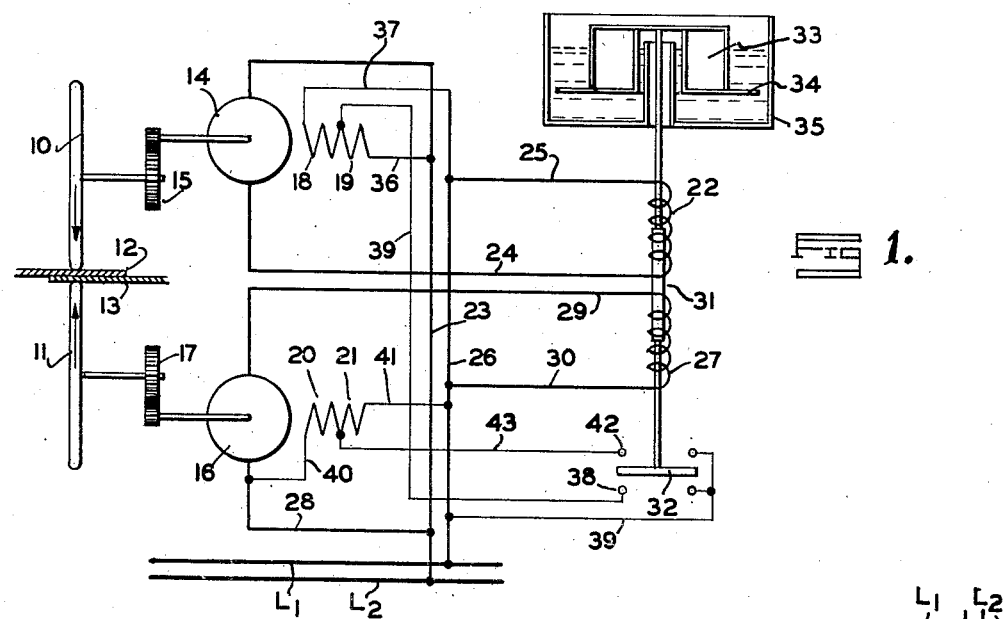
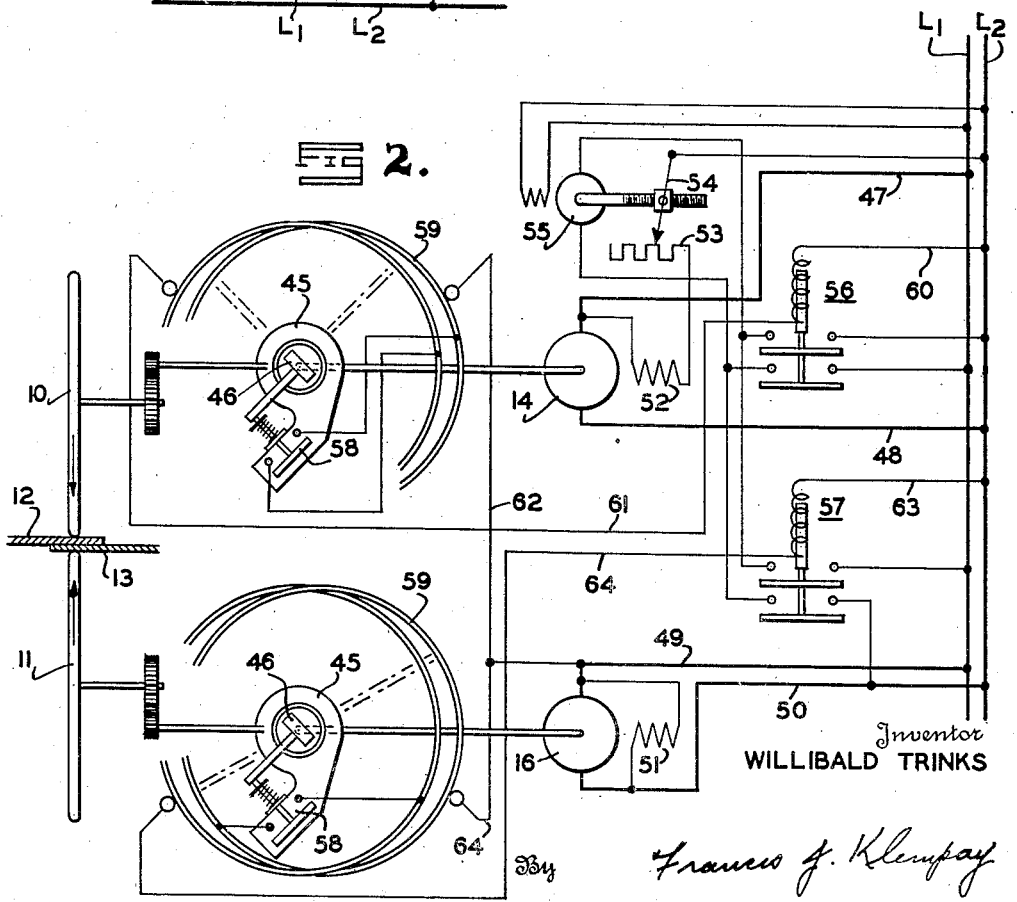
Inventor
WILLIBALD TRINKS
By Francis J. Klempay
Attorney Patented Dec. 3, 1946

2,412,069

UNITED STATES PATENT OFFICE 2,412,069

DRIVING MEANS FOR ROLLER ELECTRODES AND THE LIKE

Willibald Trinks, Pittsburgh, Pa., assignor to The Taylor-Winfield Corporation, Warren, Ohio, a corporation of Ohio Application June 16, 1944, Serial No. 540,622

10 Claims. (Cl. 219—4)

This invention relates to electric resistance welding apparatus and more particularly to such apparatus employing a pair of opposed roller electrodes which are operative to engage the work between them and to weld the work along a line or seam. In seam welding generally it is often desirable to maintain a fixed predetermined rate of progression of the work with respect to the welding electrode or electrodes or vice versa and in the case of seam welding machines employing a roller electrode rotatable about a normally fixed axis it has been proposed to effect this mode of operation by driving the roller electrode by means of an arrangement which is inherently operative to maintain a fixed peripheral speed regardless of the wear and consequent decrease in diameter of the electrode. A commonly used arrangement for this purpose comprises a steel driving wheel the diameter of which remains substantially fixed throughout its life and the periphery of which is maintained in pressure engagement with the periphery of the roller electrode. The driving wheel is readily driven at constant speed and in this manner the peripheral speed of the roller electrode remains fixed regardless of the extent of wear of the electrode but the arrangement has the serious disadvantage of limited power transmission and excessive electrode wear.

In seam welding machines employing a pair of driven roller electrodes adapted to have simultaneous engagement with the work the problem of maintaining the peripheral speeds of the electrodes equal is difficult due to unavoidable variations in the rate of wear between the respective electrodes. This is particularly true if it is desired to transmit substantial propelling forces through the electrodes without subjecting the electrodes to undue wear. It is the primary object of the present invention to provide an improved electric resistance seam welding apparatus of the type employing a pair of driven roller electrodes for engaging opposite sides of the work to be welded which is operative to keep the peripheral speeds of the two roller electrodes exactly the same whereby the rate of progression of the work through the welding throat of the apparatus or, conversely, the rate of progression of the welding throat along the work may be accurately maintained at a predetermined fixed value and whereby the contact between the work and the electrodes is always rolling contact.

A further and more general object of the invention is the provision of an improved electric resistance welding apparatus of the general type in which a plurality of roller electrodes are maintained in pressure engagement with the work to be welded and have relative movement with respect to the same which is operative to transmit a driving force through at least a pair of the electrodes while keeping the peripheral speeds of the electrodes of this pair exactly the same. Thus in welding equipment performing series welds along a line or seam, for example, both the electrodes effecting each pair of series welds may be driven in a positive manner to aid in effecting the desired constant relative movement between the work and the electrodes.

Another object of the invention is the provision of improved arrangements and devices for driving a pair of roller electrodes in electric resistance seam welding apparatus whereby substantial driving forces may be transmitted through each of the electrodes while the peripheral speeds of the respective electrodes are yet maintained substantially the same. In accordance with this more specific object of the invention I provide a multiple roller electrode driving system which operates in such manner that the torque applied to rotate the respective electrodes is automatically correlated in respect to the diameters of the respective electrodes so that the frictional forces transmitted by the peripheries of the respective electrodes to the work are substantially equal. The work, of course, presents relatively fixed surfaces for contact with the peripheries of the respective electrodes and in this manner synchronization of the peripheral speeds of the respective electrodes is insured.

The above and other objects and advantages of the invention will become apparent upon consideration of the following detailed specification and the accompanying drawing wherein there is disclosed certain preferred embodiments of the invention.

In the drawing:

Figure 1 is a schematic representation of a multiple roller electrode driving arrangement for seam welding apparatus constructed in accordance with the principles of the invention; and Figure 2 is a schematic representation of a modified form of multiple electrode driving arrangement constructed in accordance with the principles of the invention.

Referring to Figure 1, reference numerals 10 and 11 designate upper and lower roller electrodes, respectively, of an electric resistance seam welding apparatus of the kind in which rotation of the electrodes may be relied on to move the work through the welding throat of the apparatus. By way of illustration work pieces 12 and 13 to be welded together are shown as being positioned between the roller electrodes 10 and 11 and it will be readily understood that in actual practice suitable means, not shown, will be employed to apply welding current and welding pressure to these electrodes. Electrode 10 is arranged to be driven by an electric motor 14 through suitable speed reducing gearing shown schematically at 15 while electrode 11 is driven by a similar electric motor 16 through similar gearing 17. In the preferred and illustrated embodiment of the invention the motors 14 and 16 are of the direct current shunt wound type although as will appear more fully hereinafter motive means of other types may readily be employed in their stead, all within the purview of the invention.

The shunt field winding of the motor 14 is tapped to provide sections 18 and 19 while the shunt field winding of the motor 16 is similarly tapped to provide the winding sections 20 and 21. A suitable source of direct current comprising the line conductors L1 and L2 is provided and, in actual practice, the current flowing into the line L1, L2 may be either automatically or manually controlled according to the nature of the control system of the complete machine in which the features of the present invention are incorporated.

In series with the armature of motor 14 across the line L1, L2 is a solenoid 22, the circuit being traceable from line L2 through conductor 23, the armature of motor 14, conductor 24, solenoid 22, and conductors 25 and 26 to line conductor L1. Axially aligned with solenoid 22 is a similar solenoid 27 which is in series with the armature of motor 16 across the current supply line, the circuit being traceable from line conductor L2 through conductor 23, conductor 28, the armature of motor 16, conductor 29, solenoid 27, and conductors 30 and 26 to line conductor L1. Extending into the lower portion of solenoid 22 and the upper portion of solenoid 27 is an armature 31 to which is connected a contactor 32 and a float 33 having a horizontal disk or fin 34 immersed in a bath of fluid contained in a vessel 35. Solenoids 22 and 27 are oppositely poled so that normally they exert the same force on the armature 31. The buoyancy of float 33 may be made of sufficient value to carry the weight of armature 31 and the parts connected to it so that the differential relay comprised of the solenoids 22 and 27 will be sensitive in operation. The forces exerted by the respective solenoids on the armature 31 are equal in the manner indicated above when the motors 14 and 16 are drawing equal current. Inasmuch as the voltage applied to both the motors is exactly the same the amount of current drawn by the respective motors is an indication of the amount of work being done by the respective motors. This should be distinguished from the torque applied to the drive shafts of the electrodes by the motors since an indication of torque would not accurately reflect the actual frictional force exerted by the peripheries of the welding wheels on the work. Thus it will be observed that if, for example, the peripheral frictional force exerted by the wheel electrode 11 becomes less the amount of current drawn by the motor 16 must necessarily also be less. Upon this occurrence solenoid 22 overpowers solenoid 27 and the armature 31 is moved upwardly. This unbalance of the relay is utilized to correct the mechanical output of the motors in the manner now to be described.

The full shunt field winding, consisting of sections 18 and 19, of the motor 14 is connected across the principal current supply line through conductors 23, 36, 37 and 26. The tap dividing sections 18 and 19 is connected to a contact 38 by means of conductor 39 and upon downward movement of the armature 31 the contact 38 is, by means of a contactor 32 and a conductor 39, connected directly to the conductor 26. This, of course, has the effect of short circuiting the winding section 18 whereupon the motor 14 will at once begin to draw more current and attempt to pick up speed. Similarly the complete field winding, consisting of both sections 20 and 21, of the motor 16 is connected across the supply line through conductors 28, 40, 41 and 26 while the tap dividing the two sections is connected to a switch contact 42 by means of conductor 43. As shown, upon upward movement of armature 31 contact 42 is, by means of contactor 32 and conductor 39, connected directly to line 26 so that upon this occurrence section 21 is short circuited.

In operation of the apparatus described above the speeds of the respective motors 14 and 16 will normally be limited and controlled by the connection of their full shunt field windings across the current supply line and, assuming ideal conditions, the armatures of the motors will be drawing the same current so that the armature 31 will be in neutral position and the contactor 32 floating between the contacts 38 and 42. If now one of the roller electrodes, electrode 10 for example, should tend to lose speed the armature current drawn by motor 14 will become less and solenoid 22 will be overpowered by solenoid 27 thereby short circuiting field winding section 18 to speed up motor 14. As soon as this motor reaches its normal speed its armature will again take its normal current and the contactor 32 will move away from contact 38 to reestablish normal operating conditions in the assembly. Conversely, loss of speed in motor 16 will take out section 21 of its shunt field winding to reestablish normal operating speed. It should be observed, however, that this control is not based on maintaining any predetermined fixed speed of the two motors but in maintaining the speed in relation to the then existent diameters of the connected roller electrodes whereby the work output of the respective motors is kept equal and more or less constant. As explained above, this mode of operation insures the maintenance of equal peripheral driving speeds of the two roller electrodes employed.

In the modification illustrated in Figure 2 there is interposed in the lines of drive between motor 14 and electrode 10 and between 16 and electrode 11 a switch carried by a part 45 which may be rigidly connected to the motor end of the drive and an operator 46 for the switch which is rigidly connected to the electrode end of the drive. These couplings are so constructed that limited relative movement may occur between the parts 45 and 46 and the switch is so arranged that it is open when the direction of drive is from the motor to the electrode. If, however, either electrode overtakes its driving motor the switch connected to that particular electrode is closed. The opening and closing of these directional switches are utilized to control the energization of the respective driving motors 14 and 16 in a manner now to be described.

The armature of motor 14 is connected across the current supply line L1, L2 by means of conductors 47 and 48 while the armature of motor 16 is connected across this line by means of conductors 49 and 50. Field winding 51 of motor 16 is connected directly across the line L1, L2 while the field winding 52 of the motor 14 is connected in series with a variable resistance 53 across this line. The value of the resistance 53 which is in this field circuit is determined by the position of a movable contact 54 which is moved back and forth by the reverse and forward rotation, respectively, of a small reversing motor 55. I provide reversing contacts for the motor 55 actuated by the relays 56 and 57 which, in turn, are operated by the opening and closing of the switches carried and operated by the couplings 45 and 46. These switches, designated by reference numeral 58 each have two leads which are connected to a pair of slip rings 59 which are carried by and revolve with the drive shafts. When a particular switch is closed the slip rings 59 connected to this switch are interconnected electrically, otherwise they are insulated from each other.

The coil of relay 56 is in a circuit which may be traced from line conductor L2 through conductor 60, the coil of relay 56, conductor 61, rings 59 (suitable brushes being provided), and conductors 62 and 49 to line conductor L1. Actuation of relay 56 connects the armature of motor 55 across the line L1, L2 with such polarity that the contact 54 is moved to the left, as viewed in Figure 2, to increase the series resistance in the field circuit of motor 14 thereby causing this motor to draw more armature current and speed up. The coil of relay 57 is in a circuit which may be traced from line conductor L2 through conductor 63, the coil of relay 57, conductor 64, rings 59 (suitable current carrying brushes being provided), and conductors 64 and 49 to line conductor L1. Upon energization of relay 57 the armature of motor 55 connected across the line L1, L2 with such polarity that the contact arm 54 is moved to the right, as viewed in Figure 2, to decrease the resistance in series with the shunt winding 52 of the motor 14 thereby decreasing the speed of the motor 14 and allowing motor 16 to catch up and again drive its connected electrode 11.

The operation of the modified system illustrated by Figure 2 is such that the motors 14 and 16 normally take an equal load, the adjusted or neutral position of the resistance contact arm 54 being selected to effect this mode of operation. If now the speed of one of the motors, motor 16 for example, should fall behind the electrode 11 will tend to drive the coupling part 45 through the coupling part 46 thereby closing the attached switch 58 which, in turn, will energize relay 57 through the circuit above described to energize motor 55 for rotation in the direction which will decrease the resistance 53 in the shunt circuit of the motor 14 to slow down the latter and thus bring both the motors back into driving synchronism.

It should be apparent that in the system of Figure 2 the variable resistance method for correlating the speeds of the motors may readily be replaced, if desired, by the short circuiting arrangement of Figure 1—involving the use of a plurality of field winding sections for each of the motors and contactors or switches for shorting out certain of the sections as explained. Likewise, in the embodiment of Figure 1 the short circuiting method of correlating the speeds of the motors may readily be replaced by the variable resistance method of Figure 2 as will be readily understood.

It should now be apparent that I have provided improved methods and devices for driving a pair of roller electrodes having simultaneous pressure engagement with the work to be welded which accomplish the objects initially set out. By employing separate driving means for each of the electrodes and controlling these means in such a manner that they both deliver the same amount of work there can be no slippage between the electrodes and the work since the peripheral speeds of the electrodes must be alike. The present invention is based upon this inventive thought.

Inasmuch as many changes in the above specifically described embodiments of the invention may be made without departing from the spirit or scope of the invention, these embodiments should be considered as illustrative only. For example, the specific switching arrangement shown in Figure 1 for controlling the relative speeds of the motors 14 and 16 by selectively short circuiting portions of their shunt field windings may, as well, be replaced by an arrangement whereby one of the motors normally operates at a predetermined fixed speed while suitable means, operated by the armature 31, varies the voltage applied to the shunt field winding of the other motor up or down as required to effect the proper corrective action in the speed of the other motor. Such means may comprise a linear resistance element attached to the armature 31 and extending into a normally fixed bath of mercury. As the armature moves downward the resistance then in series with the shunt field winding of such other motor diminishes thus reducing the speed of the motor. Further, while I have chosen direct current shunt wound electrode driving motors for simplicity of illustration motive means of other types may be employed equally as well. I may, for example, employ a single alternating current motor with a fixed drive to one of the roller electrodes and a variable speed transmission in the drive to the other of the electrodes. The means responsive to variations in the relative speed of the electrodes would then be utilized to control the ratio of the variable speed transmission. Reference should therefore be had to the appended claims in determining the scope of the invention.

What I claim is:

1. In electric resistance seam welding apparatus having a pair of roller electrodes adapted to have simultaneous engagement with the work to be welded the combination of means to drive both said electrodes and to synchronize the peripheral speeds thereof comprising a shunt wound direct current motor for each of said electrodes and having driving connection thereto, means comprising the field windings of said motors to vary the driving speeds of said motors, and means responsive to variations in the armature current drawn by the respective motors in control of said means to vary whereby the mechanical energy delivered by said motors is maintained equalized thus synchronizing the peripheral speeds of said electrodes.

2. Apparatus according to claim 1 further characterized in that said responsive means comprises a differential solenoid having winding sections arranged to conduct current in proportion to the current drawn by the armatures of the respective motors, an armature in said solenoid, and means responsive to movement of said last mentioned armature in control of said means to vary.

3. Apparatus according to claim 1 further characterized in that said responsive means comprises a differential solenoid having winding sections arranged to conduct current in proportion to the current drawn by the armatures of the respective motors, an armature in said solenoid, damping means connected with said last mentioned armature, and means responsive to movement of said last mentioned armature in control of said means to vary.

4. In electric resistance seam welding apparatus having a pair of roller welding electrodes adapted to have simultaneous engagement with the work to be welded the combination of a driving element for each of said electrodes, said driving elements being connected to said electrodes radially inward of the peripheries thereof, differential means to drive each of said elements, and means to control said driving means in accordance with the tractive effort being exerted by the respective electrodes whereby the peripheral driving speeds of the electrodes are maintained substantially equalized.

5. In electric resistance seam welding apparatus having a pair of roller welding electrodes adapted to have simultaneous engagement with the work to be welded the combination of a driving element for each of said electrodes, said driving elements being connected to said electrodes radially inward of the peripheries thereof, differential means to drive each of said elements, and means responsive to variations in the ratio of the total mechanical energy delivered to the respective driving elements by said driving means in control of the operation of said driving means whereby the peripheral driving speeds of the electrodes are maintained substantially equal.

6. In electric resistance seam welding apparatus having a pair of roller welding electrodes adapted to have simultaneous engagement with the work to be welded the combination of means to drive each of said electrodes, a torque responsive switch in each of the lines of drive intermediate said driving means and the respective electrodes, and means responsive to actuation of said switches in control of the operation of said driving means whereby the peripheral driving speeds of the electrodes will be maintained substantially equalized.

7. In electric resistance seam welding apparatus having a pair of roller welding electrodes adapted to have simultaneous engagement with the work to be welded, a driving element for each of said electrodes, said driving elements being connected to said electrodes radially inward of the peripheries thereof, driving means for each of said driving elements, a torque responsive switch in each of the lines of drive intermediate said driving means and said driving elements, and means responsive to actuation of said switches in control of the speed ratio between said driving means.

8. In electric resistance seam welding apparatus having a pair of electrode wheels adapted to have simultaneous engagement with the work to be welded, an electric motor for each of said wheels for driving the same, opposing solenoids connected in series in the armature circuits of said motors, a common armature for said solenoids, and means operative in response to movement of said common armature to maintain the power output of the two motors substantially equal.

9. Apparatus according to claim 8 further characterized in that said motors are of the shunt wound type and in that said last mentioned means is operative to reduce the shunt field strength of the motor having less power output.

10. In electric resistance seam welding apparatus having a pair of roller welding electrodes adapted to have simultaneous engagement with the work to be welded, a driving element for each of said electrodes, said driving elements being connected to said electrodes radially inward of the peripheries thereof, driving means for each of said driving elements, a torque responsive device in each of the lines of drive to the respective electrodes, and means controlled by said torque responsive devices to control the speed ratio between said driving means.

WILLIBALD TRINKS.